United States Patent [19]
Woodbury

[11] Patent Number: 5,438,490
[45] Date of Patent: Aug. 1, 1995

[54] LIGHT MOUNT FOR VEHICLE BEING TOWED

[76] Inventor: Davis Woodbury, 2024 Adams St., Ogden, Utah 84401

[21] Appl. No.: 229,353

[22] Filed: Apr. 18, 1994

[51] Int. Cl.⁶ .............................................. B60Q 1/26
[52] U.S. Cl. ..................................... 362/61; 362/249; 362/382; 340/473
[58] Field of Search ............... 340/431, 471, 472, 473, 340/475, 687; 248/231.3, 223.4, 316.2; 362/61, 80, 83.3, 249, 250, 382, 387, 389, 391; 307/10.8

[56] References Cited

U.S. PATENT DOCUMENTS

| | | | |
|---|---|---|---|
| 2,783,367 | 2/1957 | Locke | 340/472 |
| 2,975,401 | 3/1961 | Shupe | 340/431 |
| 3,060,407 | 10/1962 | Beiswenger | 340/431 |
| 3,271,735 | 9/1966 | Gosswiller | 340/473 |
| 4,150,381 | 4/1979 | Verini | 248/223.4 |
| 4,325,052 | 4/1982 | Koerner | 340/431 |
| 4,374,376 | 2/1983 | Pillifant, Jr. | 340/473 |
| 4,625,265 | 11/1986 | Bushong | 362/80 |
| 4,703,400 | 10/1987 | Vescio et al. | 362/80 |
| 4,903,174 | 2/1990 | Busby | 340/431 |

Primary Examiner—Ira S. Lazarus
Assistant Examiner—Alan B. Cariaso
Attorney, Agent, or Firm—A. Ray Osburn

[57] ABSTRACT

A light mount and associated control cable support devices, adapted for insertion into body gaps of a vehicle being towed. Soft pliable construction of insertion wedge portions assure no damage to the surface finish of the vehicle being towed. Control cable mounting wedges of the same material prevent chafing of the surface by the control cable. The signal light unit has a bulb cover allowing the light to be seen from top, bottom, both sides and front, so that the light may be mounted in any available body gap while remaining visible from the rear of the towed vehicle.

12 Claims, 4 Drawing Sheets

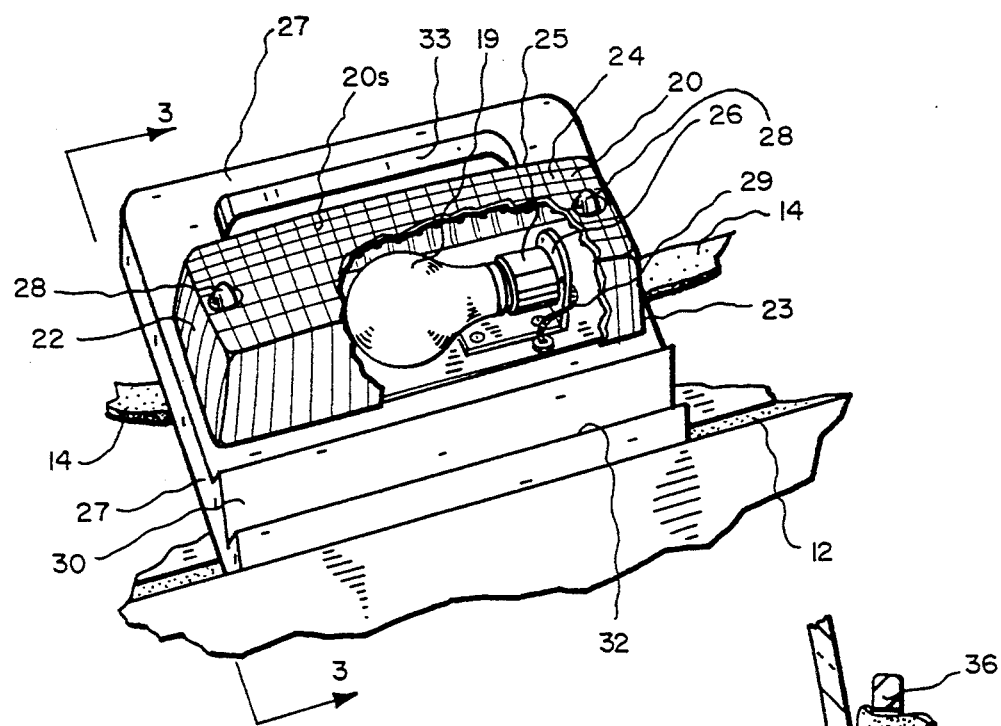
FIG. 2
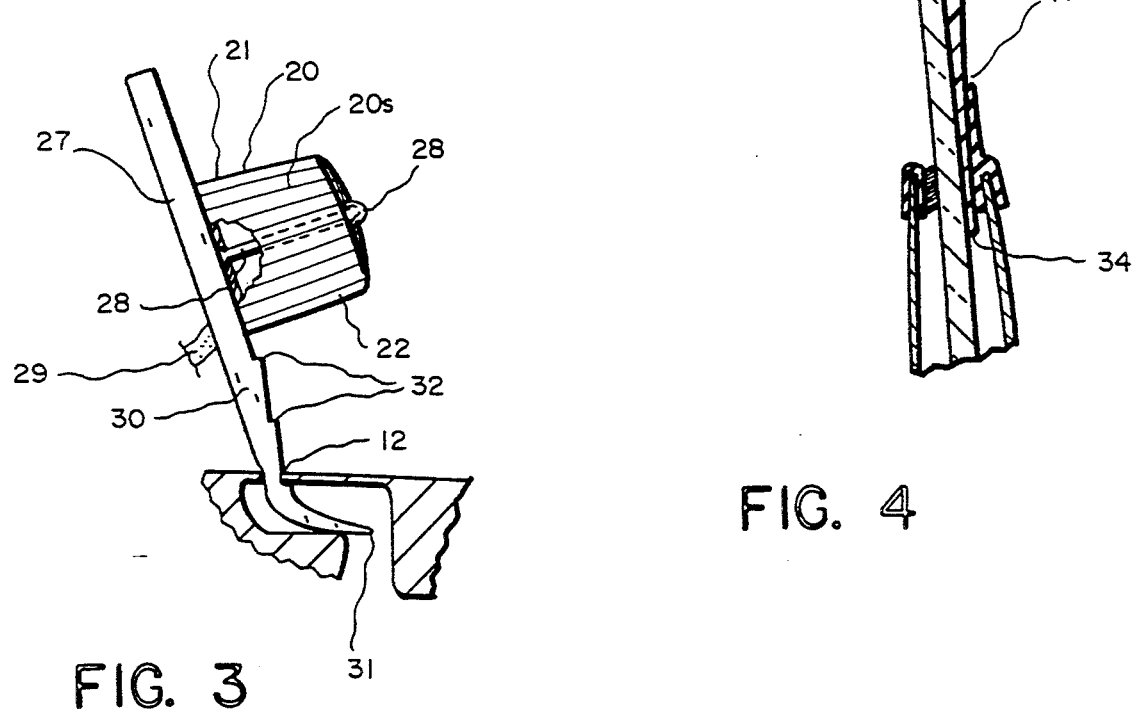
FIG. 3
FIG. 4

LIGHT MOUNT FOR VEHICLE BEING TOWED

BACKGROUND OF THE INVENTION

1. Field

The invention is concerned with apparatus for providing the required signallights upon the rear portions of automobiles, trucks and the like when being towed by another vehicle. More particularly, the invention is concerned with mounting the signal light securely without associated damage to the body structure or surface finishes of the towed vehicle.

2. State of the Art

Local, state and federal regulations require that the rear portions of all vehicles being towed upon highways or streets be equipped with a pair of light units, each providing braking, tail and turn signals under the control of the operator of the towing vehicle. The light units must be attached and firmly retained immovably under rough highway conditions. Neither the body nor bumper of the towed vehicle may be pierced to provide mounting holes, nor may paint-damaging adhesives be used. Suction cup mounts allow the light units to slide or twist upon the body surface, even when the vacuum seal is not broken. Legal access to the towed vehicle wiring and lights is generally not available, even when they are operable.

The typical prior art solution is the use of light units each incorporating a heavy base with a downwardly protruding set of powerful permanently magnetized strips of unalloyed steel. The strip magnets seize the underlying steel of the car body while bearing upon its surface finish paint. Friction to prevent shifting or rotating of the light units can come only from damaging force of the hard steel magnets against the paint. Nevertheless, sliding often does occur, scratching the finish. The plain steel magnets are susceptible to rust, which increases their abrasive roughness. Sliding during removal and installation of the units also often results in surface finish damage. (Prior Art FIGS. 5 and 6)

Rubbing and chafing damage to the car surface may also occur from the heavy control cables, typically strung unsupported against the towed vehicle surface. Damaging rubbing occurs to the surface treatment, notwithstanding the cable rubberoid sheath. (Prior Art FIG. 6)

Clearly, an improved method for mounting of towed vehicle brake, signal and tail light units is urgently needed, along with associated means for preventing damage to towed vehicle body finishes by the accompanying light control cable.

BRIEF SUMMARY OF THE INVENTION

With the foregoing in mind, the present invention eliminates or substantially alleviates the shortcomings and disadvantages in prior art mounting devices associated with towed vehicle signal light assemblies, by providing light units which may be securely attached in stable, fixed positions upon the towed vehicle, and may be installed and removed without surface damage thereto. The units each incorporate a thin mounting plate of pliable soft plastic, carrying a signal light assembly, and connected to a downwardly extending mounting plate of such material. To mount the light units, the mounting plate is wedged forcefully into gaps between body panels of the vehicle. Such gaps exist between the vehicle body and each door, the trunk lid and the hood cover, as well as between door window glass panels and door framing. To permit selective use of any available body gap, the signal light assembly is preferably selected to be clearly visible at least from its front and from both its sides.

Preferably, the mounting plates are wedge-shaped, narrowing toward the gap insertion ends. Advantageously, the mounting wedges may be serrated across for increased holding power, or comprise separate wedge-shaped sections of increasing thickness with distance from the gap insertion edge. The latter design facilitates exploitation of both narrow and wide body gaps.

Preferably, the invention includes one or more control cable support devices, each comprising a thin plastic plate which is selectively secured along the cable. Again utilizing available vehicle body gaps, the cable may be supported away from the vehicle surface to prevent abrasive damage, or the cable may be held immovably against the finish, again preventing chafing damage. Preferably, the cable mounting plates are also wedge-shaped, narrowing toward the gap insertion ends.

It is therefore the principal object of the invention to provide improved signal light units with provisions for stable, damage-free, mounting upon towed vehicles.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
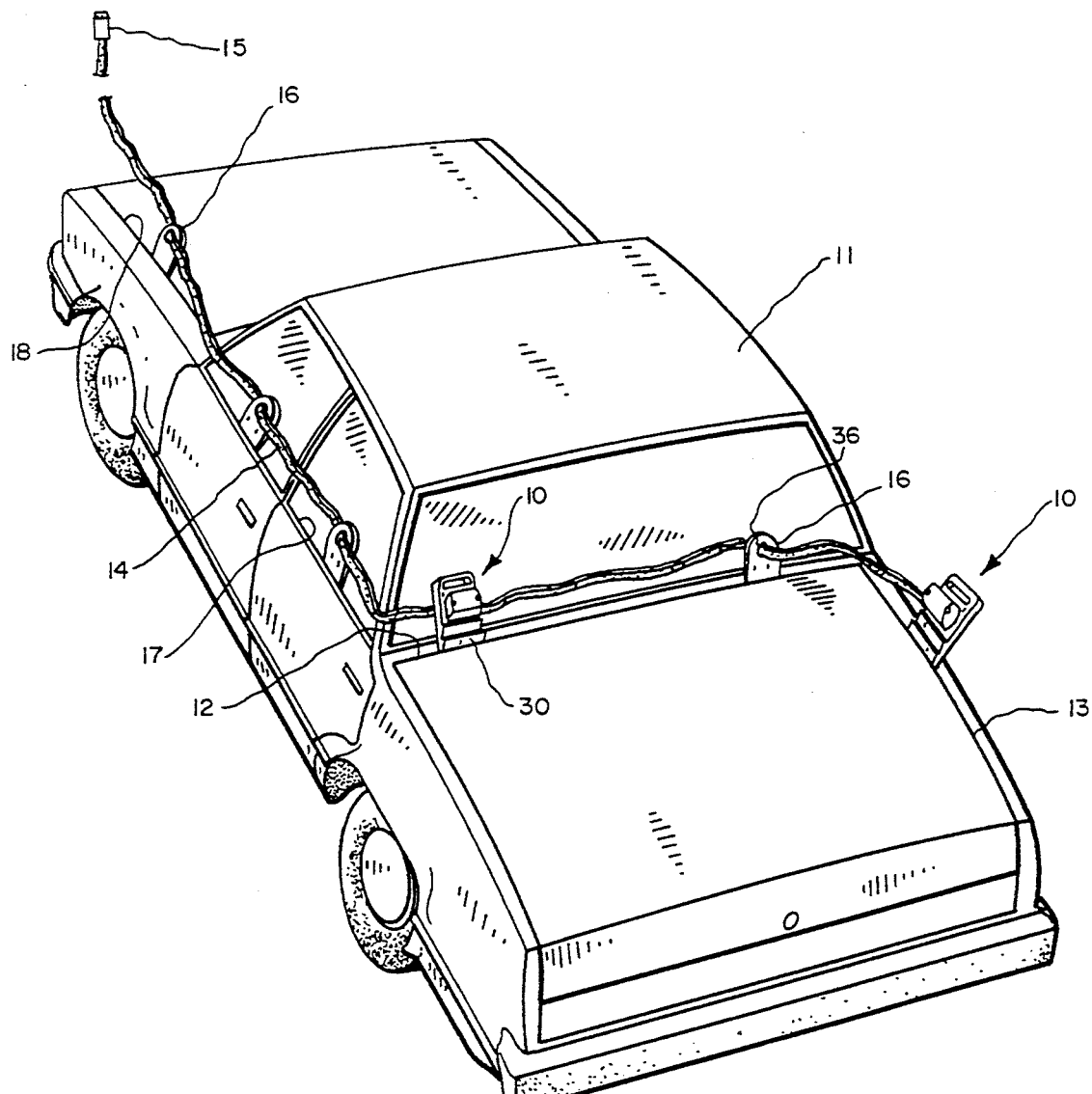
FIG. 1 is a perspective view of light mounts in accordance with the invention, installed within body gaps of a vehicle in preparation for towing, along with associated control cable and control cable supports, the latter in accordance with one aspect of the invention, drawn to a reduced scale, FIG. 2 a perspective view of a light mounted in accordance with the invention installed within the trunk cover gap of a vehicle in preparation for towing, a translucent cover thereof being cut away to show a single bulb, drawn to substantially full scale, FIG. 3 a side elevational view of the light mount of FIG. 3, showing the wedge shaped insertion portion thereof installed within the trunk cover gap, taken along line 3—3 of FIG. 2, FIG. 4 a side elevational view of a control cable support wedge, cut away to show a cable mounting perforation and associated slot, shown installed within a window-door frame gap, drawn to substantially full scale, FIG. 5 a prior art drawing showing a previous signal light and mount incorporating steel magnets for securement to the body of the towed vehicle, drawn to a reduced scale, FIG. 6 a prior art drawing showing the lights and associated mounts of FIG. 5 upon a vehicle, showing also a portion of the unsupported control cable, drawn to the approximate scale of FIG. 1, FIG. 7 a perspective view of a light mount in accordance with the invention, adapted to mount a conventional signal light assembly, drawn to the approximate scale of FIG. 5, FIG. 8 a perspective view of a light mount seen in FIG. 7, however having no lateral serrations, drawn to the same scale, FIG. 9 a perspective view of the device of FIG. 2, however having no lateral serrations, drawn to the same scale, and FIG. 10 a side elevation view of the device of FIG. 3, however having no lateral serrations.

Light signal units 10 in accordance with the invention are illustrated in FIG. 1 mounted upon a vehicle 11 in preparation for its being towed by a truck or other vehicle, not shown. One light unit 10 is mounted using, for example, the forward trunk lid gap 12. The other unit 10 uses one of the side trunk gaps 13. Tow light control cable 14 connects the light units 10 with a four wire plug assembly 15, which connects to a mating plug, not shown, carried by the towing vehicle. Cable 14 is secured to cable supports 16 to prevent rubbing contact with the surface finish of vehicle 11. Cable supports 16, for example, utilize forward trunk gap 12, side window gap 17 and a side hood cover gap 18. Other gaps than those illustrated may be available to be used by the light units and cable supports.

Light units 10, illustrated in more detail in FIGS. 2 and 3, each comprise a conventional taillight signal bulb 19 with internal filament circuitry comprising two separately illuminable filaments, permitting selective illumination to provide tail, directional turn and brake light signals as required, controlled and powered by the towing vehicle.

Base plate 27 is adapted to secure light unit 10 to vehicle 11 by its insertion into the above-mentioned body gaps. (FIG. 3) The directional orientation of light unit 20 varies with the body gap selected for mounting. It is therefore quite important that shell 20 permit the light unit to be fully visible from the rear, whether it is mounted with side portions 21 or 22, or front portion 24 facing to the rear. Thus, if more desirable forward trunk lid gap 12 is not available, full visibility of the signals will be provided if one of the signals will be provided if one of the side trunk gaps 13 can be utilized, or even if one of the side window gaps 17 must be used. The importance of this versatility is underscored by the possibility that the towed vehicle 11 has been damaged by collision or the like. Base plate 27 is of light weight, substantially flexible, soft, smooth plastic material.

Figure 8:
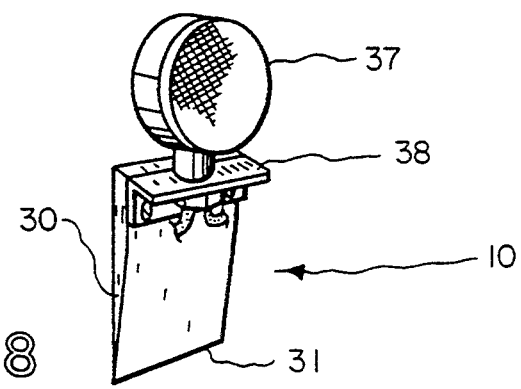
Figure 9:
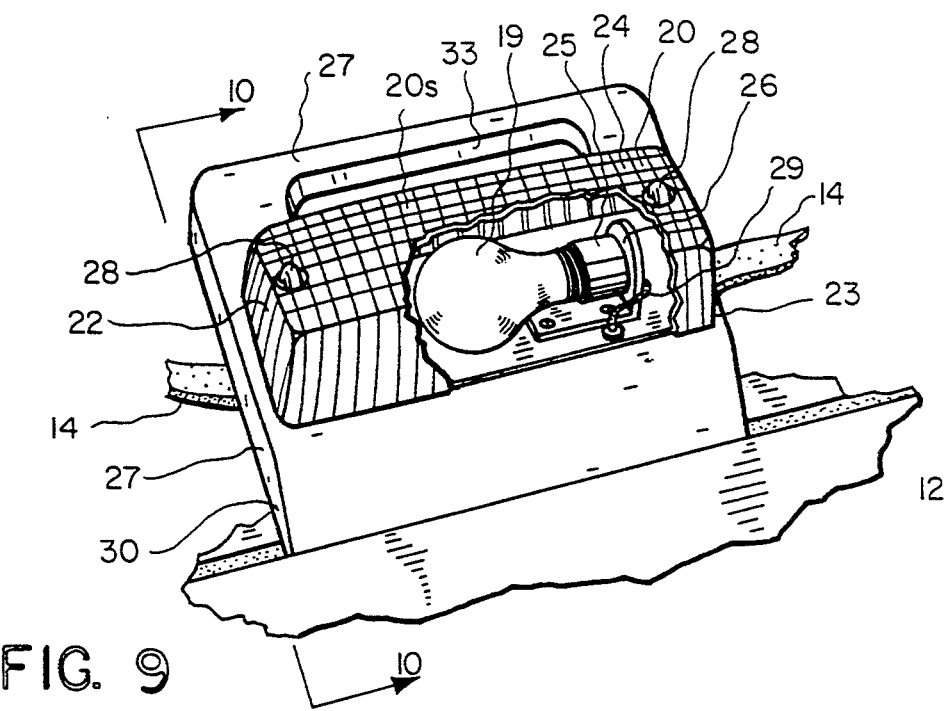
Figure 10:
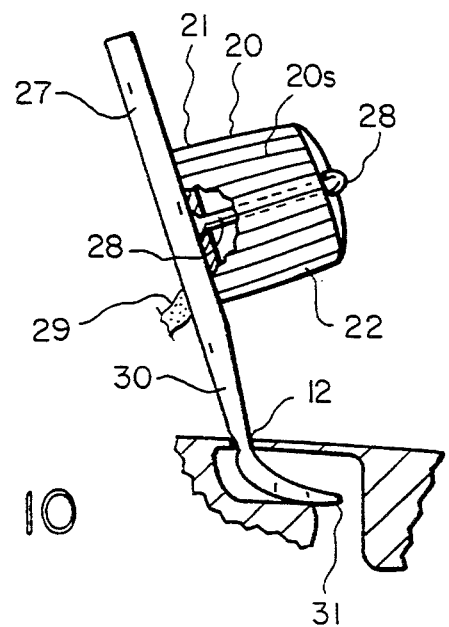

The lower, vehicle contacting portion 30 of base plate 27 is preferably of wedge shape, narrowing in thickness to a lowermost thin edge 31. Wedge 30 may be smooth (FIGS. 8-10) or may carry serrations 32 to reduce inadvertent dislodgement. As indicated in FIGS. 3 and 10, wedge 30 may in use be sharply bent to assure the secure mounting of light unit 10 upon towed vehicle 11. Softness and smoothness of the plastic material minimizes damage to the finish of the towed vehicle, even to the invisible part of the surface inside the body gaps. While other materials may be utilized, polypropylene plastic has proven quite satisfactory. A handle perforation 33 in plate 27 above light cover shell 20 has proven advantageous.

Cable supports 16 secure cable 14 adequately against rubbing contact with the surface of vehicle 11, when sized substantially smaller than required for plate 27 supporting heavier light units 10. The cable supports 16 are preferably also of wedge shape, narrowing to a thin edge 34 at the vehicle contacting ends. A slit perforation 35 or the like provides for attachment of cable 14. Cable support 16 may, if desired, be permanently installed upon cable 14, to be used where and when needed. Advantageously, however, the slits 36 may be provided for easy removal if and when required. (FIG. 4)

The illustrated and described embodiments may be changed in some respects without departing from the spirit of the invention. For example, the wedge shape of mounting plate 27 could, at the expense of somewhat less reliable performance be replaced by constant thickness plates, so long as the flexibility and smoothness are maintained. Similarly, the cable supports 16 could be embodied in constant thickness plate configuration rather than the wedge-shaped plates illustrated, again at the expense of decreased reliability and ease of use.

Figure 7:
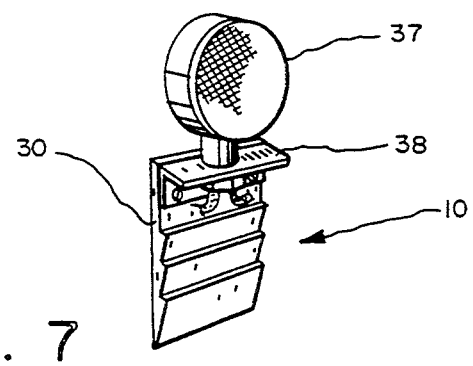
Figure 5:
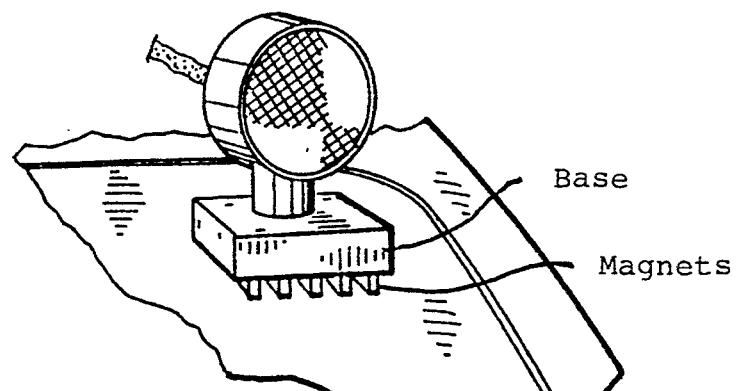
Figure 6:
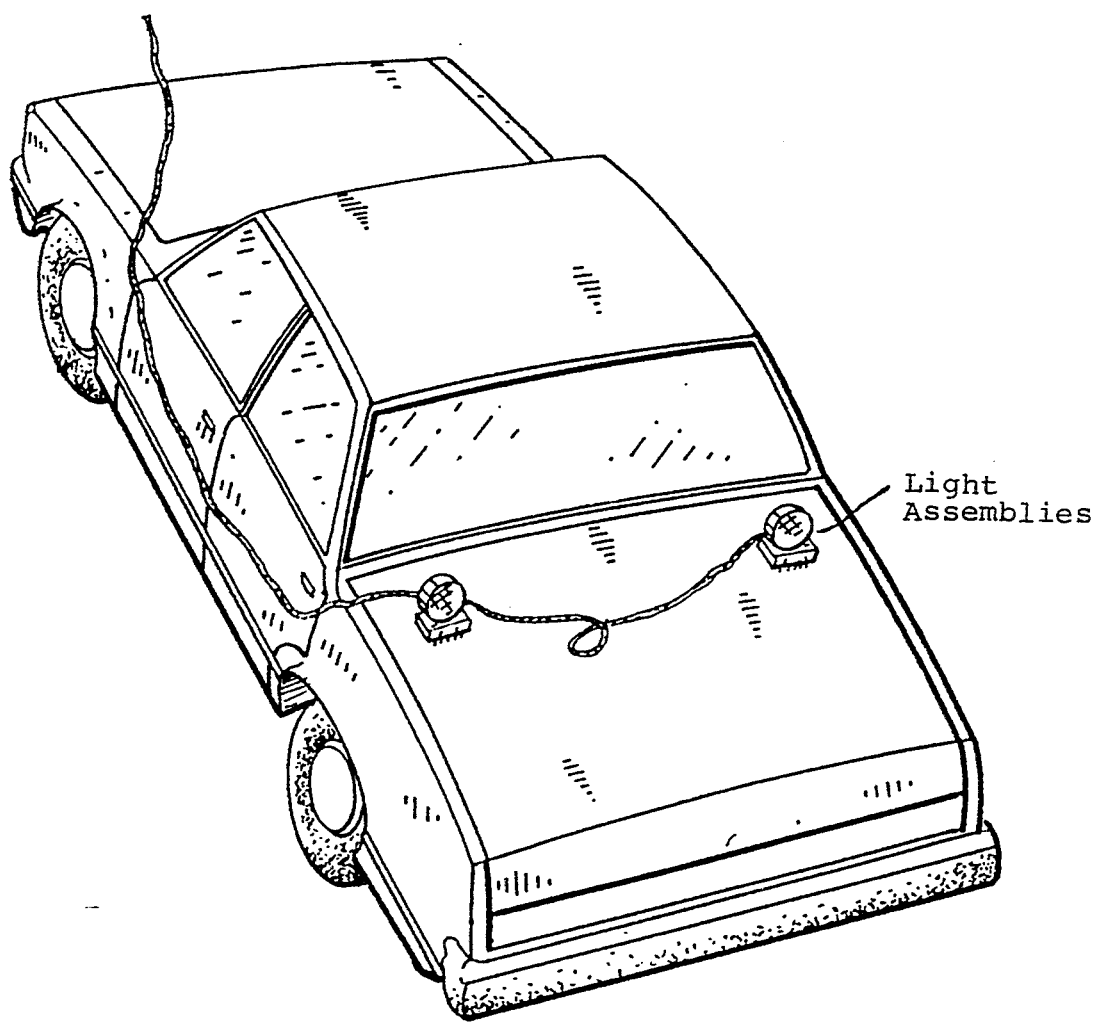

Although the illustrated visible-from-all-sides, signal light embodiment is preferable, the basic utility of the invention is achieved by the use of only the wedge 30 portion of base 27, in conjunction with more conventional light assemblies 37, secured together as by a metallic angle 38. (FIG. 7)

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters is:

1. A warning light assembly for mounting upon a vehicle being towed by a towing vehicle, comprising a pair of light units for mounting spaced apart upon the rear portion of the towed vehicle, and electrical control cable means connecting the light units to the warning light control means of the towing vehicle, wherein each light unit comprises:

light bulb means for providing steady taillight illumination, brake light illumination and intermittent turn light illumination;

a red tinted, light permeable, shell installed so that light from the bulb means is visible therethrough; and a base member with a front side, a left side, a right side and a rear side, and means securing the bulb and the shell thereto; and a thin plate member of pliable plastic joined to and extending downwardly of the base member, for forcible insertion into gaps existing between joining movable and stationary body portions of the towed vehicle when said movable portions are closed against said stationary portions, to secure the light unit to said vehicle by frictional contact between said plate member and said movable and stationary body portions.

2. The warning light assembly of claim 1, wherein:

the downwardly extending thin plate member is wedge shaped, narrowing to a thin edge distant from the bulb covering shell, permitting insertion into said body gaps of various widths.

3. The warning light assembly of claim 2, wherein:

the thin plate member further comprises at least one cross serration parallel to the gap insertion edge, to further secure the thin plate member within the body gap.

4. The warning light assembly of claim 2, wherein the thin plate member comprises:

at least two connected wedge shaped sections, the thicknesses of said sections being progressively greater at greater distances of the sections from the insertion edge of the thin plate member, the thickest portion of each section being thicker than the joining end of the next previous wedge section.

5. The warning light assembly of claim 1, wherein:
the shell is permeable to light at least in a direction outwardly from the front, right and left sides of the base, so that the light unit may be installed into any body gap of the towed vehicle with the light visible from the rear thereof.

6. The warning light assembly of claim 2, wherein:
the shell is permeable to light at least in a direction outwardly from the front, right and left sides of the base, so that the light unit may be installed into any body gap of the towed vehicle with the light visible from the rear thereof.

7. The warning light assembly of claim 3, wherein:
the shell is permeable to light at least in a direction outwardly from the front, right and left sides of the base, so that the light unit may be installed into any body gap of the towed vehicle with the light visible from the rear thereof.

8. The warning light assembly of claim 1, further comprising:
at least one separate thin plate member of pliable plastic for insertion at one end into gaps between body portions of the towed vehicle, having provisions, at the end thereof opposite the insertion end, for its connection to the control cable at selective locations therealong.

9. The warning light assembly of claim 2, further comprising:
at least one separate thin plate member of pliable plastic for insertion at one end into gaps between body portions of the towed vehicle, having provisions, at the end thereof opposite the insertion end, for its connection to the control cable at selective locations therealong.

10. The warning light assembly of claim 7, further comprising:
at least one separate thin plate member of pliable plastic for insertion at one end into gaps between body portions of the towed vehicle, having provisions, at the end thereof opposite the insertion end, for its connection to the control cable at selective locations therealong.

11. The warning light assembly of claim 1, wherein:
the shell is shaped to permit light from a bulb to be visible therethrough at least from the front, right side, and left side directions.

12. The warning light assembly of claim 2, wherein:
the shell is shaped to permit light from a bulb to be visible therethrough at least from the front, right side, and left side directions.

* * * * *